US012715208B2

(12) United States Patent
Tokimatsu

(10) Patent No.: US 12,715,208 B2
(45) Date of Patent: Aug. 25, 2026

(54) INKJET RECORDING APPARATUS AND ABNORMALITY DETECTION METHOD FOR INK CHANNEL

(71) Applicant: Konica Minolta, Inc., Tokyo (JP)

(72) Inventor: Hiroyuki Tokimatsu, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 119 days.

(21) Appl. No.: 18/962,107

(22) Filed: Nov. 27, 2024

(65) Prior Publication Data

US 2025/0187330 A1 Jun. 12, 2025

(30) Foreign Application Priority Data

Dec. 6, 2023 (JP) ................................ 2023-206388

(51) Int. Cl.

| | |
|---|---|
| ***B41J 2/18*** | (2006.01) |
| ***B41J 2/045*** | (2006.01) |
| ***B41J 2/165*** | (2006.01) |
| ***B41J 2/175*** | (2006.01) |

(52) U.S. Cl.

CPC ......... *B41J 2/0451* (2013.01); *B41J 2/17563* (2013.01); *B41J 2/17596* (2013.01); *B41J 2/04581* (2013.01)

(58) Field of Classification Search

CPC ........ B41J 2/18; B41J 2/0451; B41J 2/16579; B41J 2/04596; B41J 2/04598

See application file for complete search history.

(56) References Cited

U.S. PATENT DOCUMENTS

| | | | | |
|---|---|---|---|---|
| 2012/0024395 A1* | 2/2012 | Furukawa | ................ | B41J 29/38 222/23 |
| 2015/0375520 A1* | 12/2015 | Arimoto | .............. | G01L 27/002 347/6 |

FOREIGN PATENT DOCUMENTS

| | | | | |
|---|---|---|---|---|
| EP | 4219171 A1 * | 8/2023 | ............. | B41J 2/175 |
| JP | 2011-115990 A | 6/2011 | | |

* cited by examiner

*Primary Examiner* — Scott A Richmond

(74) *Attorney, Agent, or Firm* — LUCAS & MERCANTI, LLP

(57) ABSTRACT

An inkjet recording apparatus, including: an ink channel that connects a recording head and an ink tank containing ink to be supplied to the recording head; a pressure sensor that detects a liquid pressure in the ink channel or the ink tank; and one or more hardware processors. The one or more hardware processors determine whether or not there is an abnormality in the ink channel based on a liquid pressure of the ink fed at the different flow rate.

10 Claims, 8 Drawing Sheets

INKJET RECORDING APPARATUS AND ABNORMALITY DETECTION METHOD FOR INK CHANNEL

CROSS REFERENCE TO RELATED APPLICATIONS

The entire disclosure of Japanese Patent Application No. 2023-206388 filed on Dec. 6, 2023 is incorporated herein by reference in its entirety.

BACKGROUND

Technological Field

The present invention relates to an inkjet recording apparatus and an abnormality detection method for an ink channel.

Description of Related Art as a method of detecting an abnormality (clogging, leakage) in an ink channel for an inkjet recording apparatus, for example, a method is known in which abnormality is detected by using a pressure sensor disposed in a channel or a tank as described in Japanese Unexamined Patent Publication No. 2011-115990.

In the liquid ejecting apparatus of PTL 1, a pressure sensor is provided in an ink supply path for supplying ink from an ink tank to a recording head, and whether or not there is an abnormality in the channel based on the pressure of the ink detected by the pressure sensor.

It is known that in the inkjet recording apparatus, there is considerable variation (difference) in pressure of the ink flowing through the ink channel in a normal state depending on the amount of air in the ink, the temperature of the ink, and the like even.

Therefore, in a structure in which a pressure value of ink flowing in a channel is simply detected to determine the presence of the abnormality in the channel based on the detected pressure value as in the inkjet recording apparatus of PTL 1, variation occurs in measured values even if the measured values are normal values. Therefore, there is a problem that the measured pressure value representing an abnormal state is buried in the variation range of the normal pressure values.

As such, it has been found that the conventional configuration cannot detect an abnormality until a serious abnormality occurs in the ink channel. Consequently, the maintenance of the apparatus can be allowed only after the occurrence of serious abnormalities, which makes it difficult to perform the repair of the apparatus.

SUMMARY

An object of the present invention is to provide an inkjet recording apparatus and an abnormality detection method for an ink channel that can increase the accuracy of detection of an abnormality in the ink channels and detect and easily perform the repair of the apparatus the abnormality before it becomes a serious abnormality.

An inkjet recording apparatus reflecting one aspect of the present invention includes: an ink channel that connects a recording head and an ink tank containing ink to be supplied to the recording head; a pressure sensor that detects a liquid pressure in the ink channel or the ink tank; a liquid feeder that applies pressure to the ink in the ink channel or the ink tank to feed the ink at a different flow rate different from a flow rate for printing; and one or more hardware processors. The one or more hardware processors determine whether or not there is an abnormality in the ink channel based on a liquid pressure of the ink fed at the different flow rate. An abnormality detection method reflecting one aspect of the present invention is a method for an ink channel through which ink is supplied from an ink tank to a recording head, the method including: feeding the ink in the ink channel at a different flow rate different from a flow rate for printing; detecting a liquid pressure of the ink fed to the ink channel at the different flow rate different from the flow rate for printing; and determining whether the ink channel is abnormal by comparing the liquid pressure detected with a liquid pressure of the ink normally fed at the different flow rate different from the flow rate for printing.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
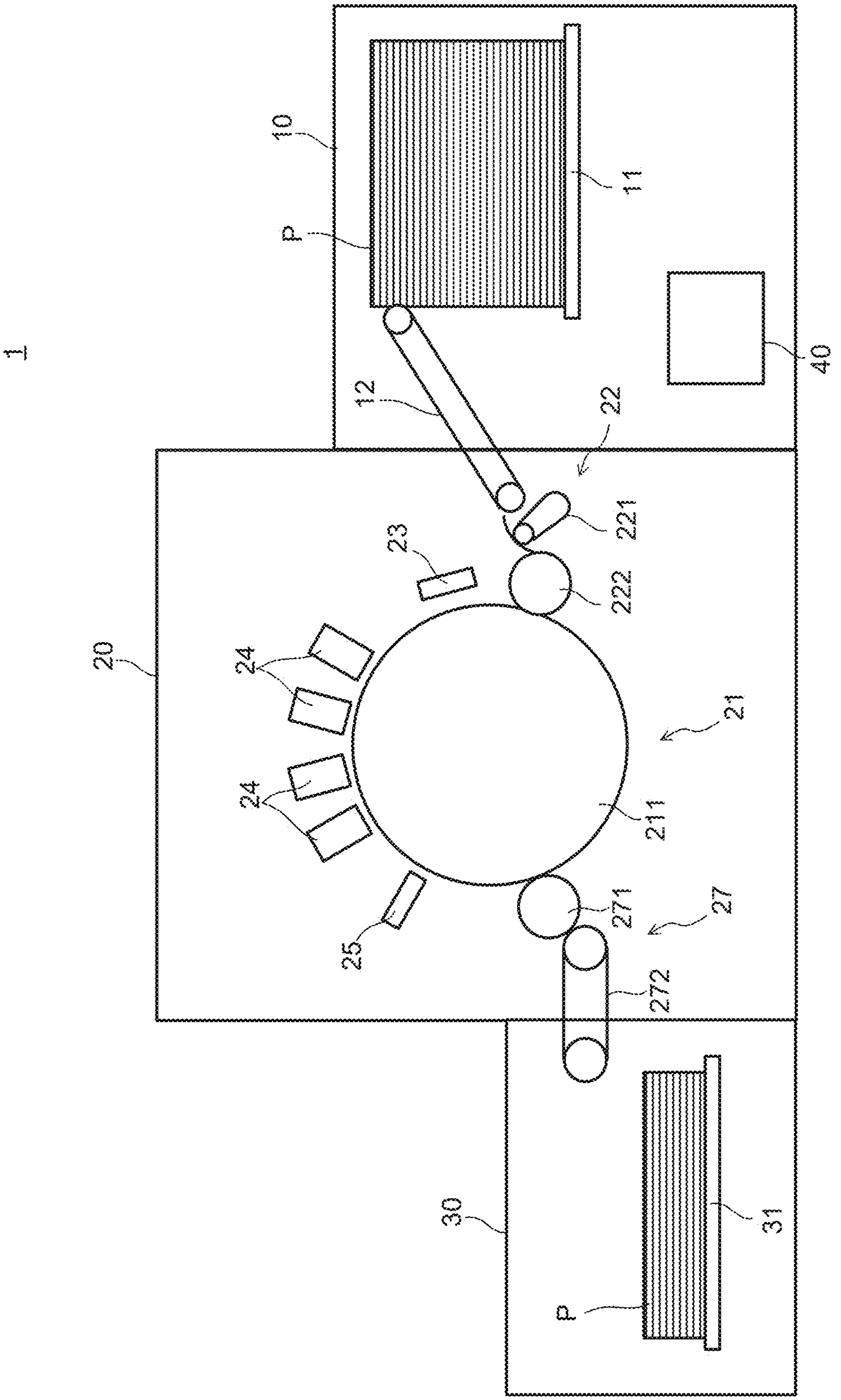
FIG. 1 is a diagram illustrating a schematic configuration of an inkjet recording apparatus according to an embodiment of the present invention.

Hereinafter, one or more embodiments of the present invention will be described with reference to the drawings. However, the scope of the invention is not limited to the disclosed embodiments.

Hereinafter, preferred embodiments of the present disclosure will be described in detail with reference to the accompanying drawings. In this specification and the drawings, components having substantially the same functions are denoted by the same reference numerals, and redundant description thereof will be omitted.

Overall Configuration of Inkjet Recording Apparatus

Hereinafter, a configuration of an inkjet recording apparatus (hereinafter, also referred to as "recording apparatus") 1 according to the embodiment of the invention will be described with reference to FIGS. 1 to 3.

FIG. 1 is a diagram illustrating a schematic configuration of the inkjet recording apparatus 1 according to the embodiment of the invention. The recording apparatus 1 includes a sheet feeder 10, an image former 20, a sheet ejector 30, and a controller (one or more hardware processors) 40. The recording apparatus 1, under control of the controller 40, conveys a recording medium P stacked in the sheet feeder 10 to the image former 20, ejects ink onto the recording medium P at the image former 20 to record an image thereon, and conveys the recording medium P having the image recorded thereon to the sheet ejector 30. Specifically, the recording apparatus 1 records a color image on the recording medium P by outputting four colors of yellow (Y), magenta (M), cyan (C), and black (K) with a predetermined number of recording gradations each on the recording medium P in a superimposed manner.

As the recording medium P, in addition to sheet such as a plain paper or a coated paper, various media can be used on which ink having landed on the surface can be fixed, such as cloth or sheet-like resin.

The sheet feeder 10 includes a sheet feed tray 11 that stores the recording medium P, and a medium supplier 12 that conveys and supplies the recording medium P from the sheet feed tray 11 to the image former 20. The sheet supplier 12 includes a ring-shaped belt whose inner side is supported by two rollers, and rotates the rollers while the recording medium P is placed on the belt to convey the recording medium P from the sheet feed tray 11 to the image former 20.

The image former 20 includes a conveyer 21, a handover unit 22, a heater 23, a head unit 24, an irradiator 25, and a deliverer 27.

The conveyer 21 holds the recording medium P placed on a conveyance surface of a cylindrical conveyance drum 211. The conveyer 21 conveys the recording medium P on the conveyance drum 211 in a conveyance direction along the conveyance surface as the conveyance drum 211 rotates and circulates around a rotary shaft (cylindrical shaft) extending in a width direction of the recording medium P.

The conveyance drum 211 includes a claw part and a suction part (not illustrated) for holding the recording medium P on the conveyance surface. The recording medium P is held on the conveyance surface by being pressed at the end by the claw part and by being sucked to the conveyance surface by the suction part.

The handover unit 22 is provided at a position between the medium supplier 12 of the sheet feeder 10 and the conveyer 21, and holds one end of the recording medium P conveyed from the medium supplier 12 with a swing arm 221 to pick the recording medium P up, and then hands over the recording medium P to the conveyer 21 via the handover drum 222.

The heater 23 is provided between the arrangement position of the handover drum 222 and the arrangement position of the head unit 24, and heat the recording medium P so that the recording medium P conveyed by the conveyer 21 has a temperature within a predetermined temperature range. The heater 23 includes, for example, an infrared heater or the like, and energizes the infrared heater on the basis of the control signal supplied from the controller 40 to cause the infrared heater to generate heat.

The head units 24 eject ink onto the recording medium P from nozzle openings provided in an ink ejection surface facing the conveyance surface of the conveyance drum 211 at appropriate timings in accordance with the rotation of the conveyance drum 211 holding the recording medium P, to record an image.

The head unit 24 includes a plurality of inkjet heads and is disposed such that ink (droplet) ejection faces of the inkjet heads and a conveyance surface are spaced from each other by a predetermined distance.

In the recording apparatus 1 of the present embodiment, four head units 24 respectively corresponding to four color inks of Y, M, C, and K are arranged at predetermined intervals in the order of the colors of Y, M, C, and K from the upstream side in the transport direction of the recording medium P. That is, each of the head units 24 is configured to be capable of ejecting a plurality of different types of ink.

The head unit 24 is used while being fixed in position during image recording, and sequentially ejects ink onto different positions in the conveyance direction at predetermined intervals (conveyance direction intervals) in accordance with the conveyance of the recording medium P, to record an image in a single-pass manner.

Figure 2:
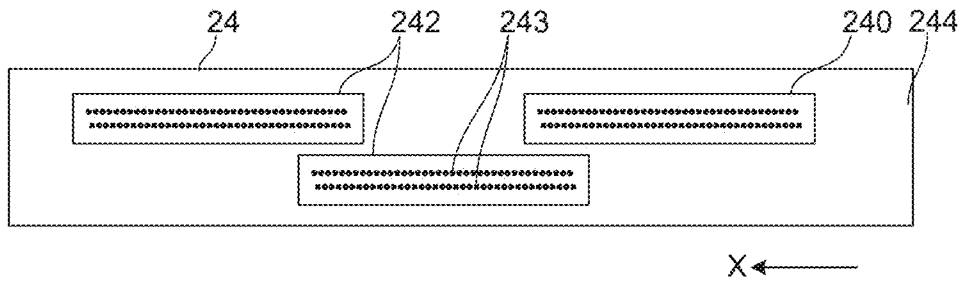
FIG. 2 is a schematic diagram illustrating a configuration of a head unit according to the embodiment of the present invention.

FIG. 2 is a schematic diagram illustrating a configuration of the head unit 24. Here, the surface of the head unit 24 that faces the outer peripheral surface of the conveyance drum 211 is illustrated.

Here, the head unit 24 includes three ink jet heads (recording heads) 240 attached to an attachment member 244. Each inkjet head 240 is provided with a plurality of image forming elements (recording elements) and each including a pressure chamber (not illustrated) for storing ink, a piezoelectric element and (not illustrated) provided on a wall surface of the pressure chamber, and a nozzle 243.

In this image forming element, in response to input of a drive signal for deforming the piezoelectric element, the deformation of the piezoelectric element deforms the pressure chamber to change the pressure in the pressure chamber, thereby causing the inkjet head 240 to eject ink from the nozzle 243 communicating with the pressure chamber.

Three inkjet heads 240 are arranged in a houndstooth check pattern such that arrangement ranges of the nozzle arrays in the X direction are continuously connected. The arrangement range of the nozzles 13 included in the head unit 24 in the X direction covers the width in the X direction of the area where the image is formed in the recording medium P conveyed by conveyance drums 211. The head unit 24 is used in a fixed position relative to the rotation shaft of the conveyance drum 211 during formation of the image. That is, the head unit 24 includes a line head capable of ejecting ink over an image formable width in the X direction with respect to the recording medium P.

The inkjet head 240 includes an ink heater (not illustrated) that heats ink stored in the inkjet head 240, and ejects ink that has been heated and turned into a sol state. When the sol-like ink is ejected onto the recording medium P, the ink droplets are landed on the recording medium P and then naturally cooled, so that the ink is quickly gelated and solidified on the recording medium P.

The irradiator (fixer) 25 is arranged over the width of the conveyer 21, and irradiates the recording medium P placed on the conveyer 21 with energy rays (electromagnetic waves) such as ultraviolet rays. The irradiator 25 applies predetermined energy to the ink ejected onto the recording medium P, thereby curing and fixing the ink onto the recording medium P. The irradiator 25 is disposed facing the conveyance surface between the arrangement position of the head unit 24 and the arrangement position of the transport drum 271 of the deliverer 27 in the conveyance direction.

The deliverer 27 includes a belt loop 272 having an inner face supported by two rollers and a cylindrical transport drum 271 that transports the recording medium P from the conveyer 21 to the belt loop 272. The deliverer 27 conveys by the belt loop 272 the recording medium P transported by the transport drum 271 from the conveyer 21 onto the belt loop 272 and delivers the recording medium P to the sheet ejector 30.

The sheet ejector 30 includes a sheet ejection tray 31 with a plate shape on which the recording medium P sent from the image former 20 by the deliverer 27 is placed.

Figure 3:
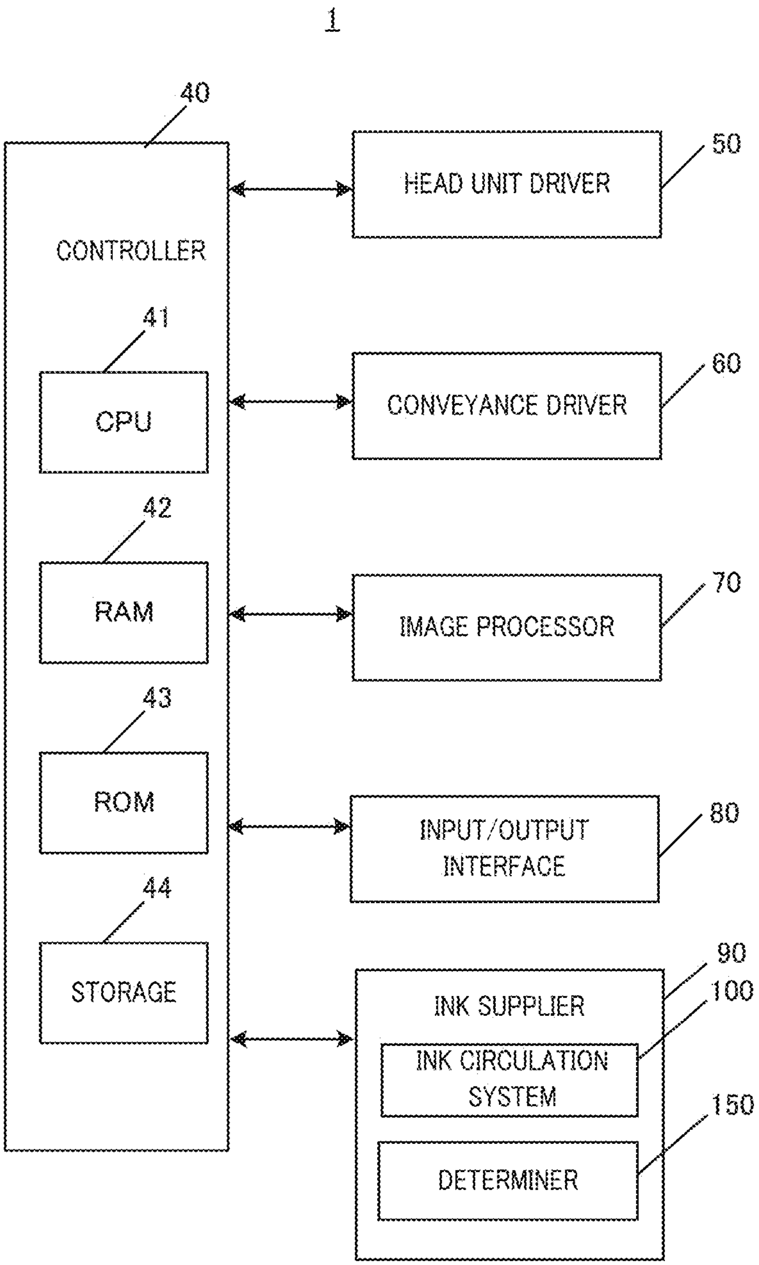
FIG. 3 is a block diagram illustrating main functional configuration of an inkjet recording apparatus according to the embodiment of the present invention.

FIG. 3 is a block diagram illustrating a main functional configuration of the recording apparatus 1. The recording apparatus 1 includes a controller 40, a head unit driver 50, a conveyance driver 60, an image processor 70, an input/output interface 80, and an ink supplier 90.

The control unit 40 includes a CPU (Central Processing Unit) 41, a RAM (Random Access Memory) 42, a ROM (Read Only Memory) 43, and a storage 44. The controller 40 comprehensively controls the overall operation of the recording apparatus 1.

The head unit driver 50 sends drive signals in accordance with the image data at appropriate timings to the recording elements of the head unit 24 under the control of the controller 40 so as to eject ink from the nozzles of the head unit 24 in an amount corresponding to the pixel values of the image data.

The conveyance driver 60 sends a driving signal to a conveyance drum motor provided in the conveyance drum 211 on the basis of the control signals from the controller 40 so as to rotate the conveyance drum 211 at predetermined rate and timing. Further, the conveyance driver 60 supplies drive signals to the motors for operating the medium supplier 12, the handover unit 22, and the deliverer 27 on the basis of the control signals supplied from the controller 40. The conveyance driver 60 causes a motor to supply the recording medium P to the conveyer 21 and eject the recording medium P from the conveyer 21.

The image processor 70 performs predetermined image processing on the image data received from the input/output interface 80 and stores the resulting image data in the storage 44. The image processing includes correction processing for correcting image data, as well as color conversion processing, tone correction processing, and pseudo halftone processing.

The input/output interface 80 is connected to an input/output interface of an external device (for example, a personal computer), and mediates transmission and reception of data between the control unit 40 and the external device. The input/output interface 80 includes, for example, various serial interfaces, various parallel interfaces, or a combination of these interfaces.

The ink supplier 90 supplies ink stored in a main tank 112 (see FIG. 4) to each of the plurality of inkjet heads 240 provided in the head unit 24. The ink supplier 90 adjusts the amount of ink to be supplied to each of the plurality of inkjet heads 240 in accordance with a control signal from the controller 40.

Configuration of Ink Supplier 90

A configuration of the ink supplier 90 according to the present embodiment is described below. The ink supplier 90 includes an ink circulation system 100 having an ink channel 110, and a determiner (controller) 150.

The ink supplier 90 supplies ink from the main tank 112 to the inkjet head 240 in the ink circulation system 100.

The ink circulation system 100 performs printing by feeding ink in the ink channel 110, a first storage tank 120, and a second storage tank 140 and ejecting the ink from the inkjet head 240.

The ink circulation system 100 is a system that supplies ink from an ink tank to the inkjet head 240 as a supply target via the channel. In this system, an ink was fed to the channel and the pressure was detected. Then, the inventor has found that when clogging occurs in a channel, the liquid pressure of ink increases. In addition, the inventor has found that when a leakage occurs in the channel, the liquid pressure of the ink decreases. More specifically, the inventor of the present invention has found that, when clogging has occurred in each of the ink channel 110, the first storage tank 120, and the second storage tank 140, the pressure of the ink in each tank becomes higher than in the normal state. In addition, the present inventor has found that, when a leakage has occurred in each of the ink channel 110, the first storage tank 120, and the second storage tank 140, the pressure value of the ink inside each of them becomes lower than in the normal state. Then, it was found that, by feeding the ink at a flow rate different from the flow rate of the ink for printing (normal state) in the abnormal states of “clogging” and “leakage”, the pressure value (abnormal value) in the abnormal state and the pressure value in the normal state can be more clearly distinguished. Note that “clogging” is mainly “clogging” in the ink channel 110, but is also “clogging” in a portion serving as a channel through which ink flows, and includes “clogging” in a filter 134 in FIG. 4.

In view of this, the ink supplier 90 causes the determiner 150 to determine abnormality (abnormality due to leakage, clogging, or the like) of the ink flowing through the ink channel 110 of the ink circulation system 100.

Figure 4:
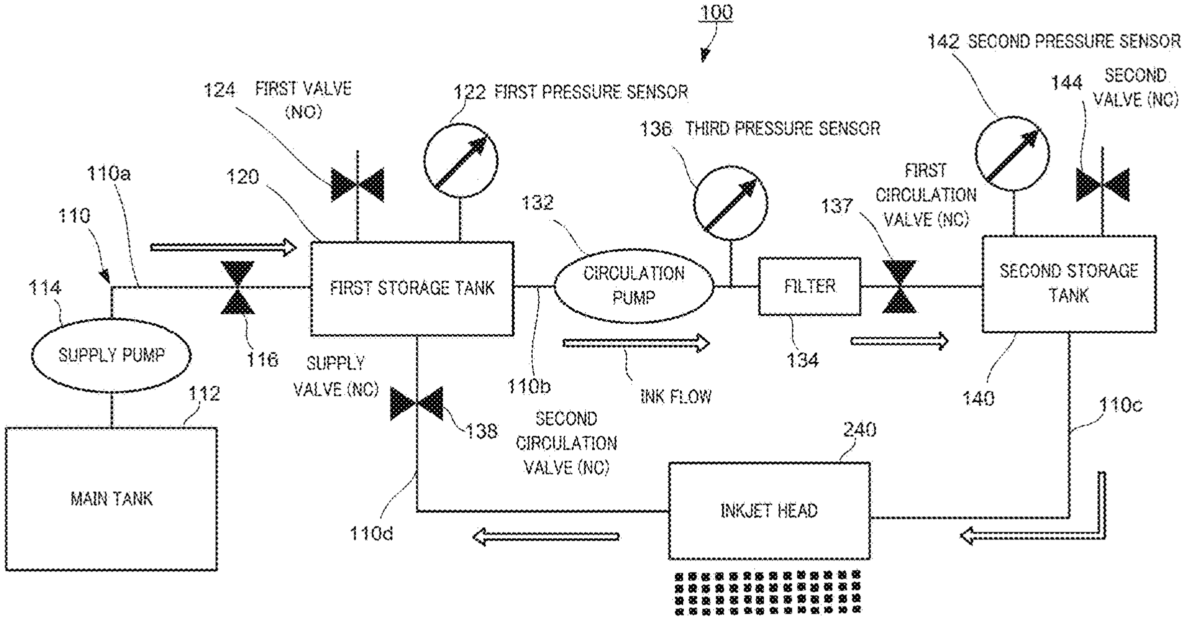
FIG. 4 is a diagram showing a configuration of a main part of an ink circulation system of an inkjet recording apparatus according to the embodiment of the present invention.

FIG. 4 is a diagram showing a configuration of a main part of the ink circulation system of the inkjet recording apparatus according to the embodiment of the present invention. Note that the ink circulation system 100 illustrated in FIG. 4 is provided for each color ink.

The ink circulation system 100 includes an ink channel 110 that supplies ink from the main tank 112 to the inkjet head 240. The ink circulation system 100 includes the main tank 112, the first storage tank 120, the filter 134, the second storage tank 140, and the inkjet head 240 from the upstream side of an ink channel 110. In addition, the ink circulation system 100 includes a first pressure sensor 122 and a first valve 124 which are connected to the first storage tank 120, and a second pressure sensor 142 and a second valve 144 which are connected to the second storage tank 140. In addition, the ink circulation system 100 includes a supply pump (liquid feeder) 114, a supply valve 116, a circulation pump (liquid feeder) 132, a third pressure sensor 136, a first circulation valve 137, and a second circulation valve 138 on the ink channel 110.

The ink channel 110 includes a first supply channel 110*a*, an inter-tank channel 110*b*, a second supply channel 110*c*, and a collection channel 110*d*. The first supply channel 110*a* connects the main tank 112 and the first storage tank 120. In the first supply channel 110*a*, the supply pump 114 and the supply valve 116 are arranged in this order from the upstream side between the main tank 112 and the first storage tank 120. The first supply channel 110*a* supplies ink from the main tank 112 to the first storage tank 120.

The inter-tank channel 110*b* connects the first storage tank 120 and the second storage tank 140. In the inter-tank channel 110*b*, the circulation pump (liquid feeder) 132, the third pressurizing sensor 136, and the first circulation pump 137 are disposed in this order from the upstream side between the first storage tank 120 and the second storage tank 140. The inter-tank channel 110*b* supplies ink from the first storage tank 120 to the second storage tank 140.

The second supply channel 110*c* connects the second storage tank 140 and the ink jet head 240, and supplies the ink from the second storage tank 140 to the ink jet head 240.

The collection channel 110*d* connects the inkjet head 240 and the first storage tank 120, and collects via the second circulation valves 138 the ink that has not been ejected by the inkjet head 240 and returns it to the first storage tank 120.

The ink circulation system 100 supplies ink to the compression chambers of the recording elements (image forming elements) in the inkjet head 240 via the second supply channel 110*c*. Of the ink supplied to the chambers of the respective recording elements in the inkjet head 240, the ink that is not ejected from the nozzles of the inkjet head 240 is collected in the first storage tank 120 via the collection channel 110*d*. Note that the second supply channel 110*c* is connected to an ink inflow port of the inkjet head 240, and the collection channel 110*d* is connected to an ink outflow port of the inkjet head 240.

The inter-tank channel 110*b*, the second supply channel 110*c*, and the collection channel 110*d* constitute a circulating channel for circulating ink to the inkjet head 240, together with the first storage tank 120 and the second storage tank 140. Note that the first supply channel 110*a*, the inter-tank channel 110*b*, the second supply channel 110*c*, and the collection channel 110*d* are constituted by, for example, piping formed of hoses or pipes.

In addition, although three ink jet heads 240 are illustrated in FIG. 2, the three ink jet heads 240 have the same configuration in the present embodiment. When the three ink-jet heads 240 are not distinguished from each other, only one of the ink-jet heads 240 will be described.

The main tank 112 accommodates or stores ink to be supplied to the inkjet head 240 on the most upstream side of the ink channel.

The supply pump 114 sends the ink inside the main tank 112 to the inkjet head 240 side, specifically, to the first storage tank 120. The supply pump 114 is disposed on the first supply channel 110*a* together with the supply valve 116. The ink sent out from the supply pump 114 is supplied to or stopped from being supplied to the first storage tank 120 by opening or closing the supply valve 116.

The supply pump 114 is disposed, for example, between the main tank 112 and the first storage tank 120, that is, in the first supply channel 110*a*, and feeds the ink in the first supply channel 110*a* to the first storage tank 120 when the supply valve 116 is open. The supply pump 114 is controlled by a control signal from the controller 40 or the ink supplier 90.

The supply valve 116 is a valve that opens and closes the channel of the ink from the main tank 112 to the first storage tank 120. The supply valve 116 is normally in a closed state (NC), and is in an open state at the time of supply. The supply valve 116 supplies or stops the supply of the ink from the main tank 112 to the first storage tank 120.

The first storage tank 120 stores the ink supplied from the main tank 112 during image formation, and supplies the stored ink to the second storage tank 140 provided on the downstream side via the inter-tank channel 110*b*.

The first valve 124 opens and closes the first storage tank 120 to seal or release the inside of the first storage tank 120. The first valve 124 is controlled by the controller 40 or the ink supplier 90 (determiner 150) and is normally in an open state.

The first pressure sensor 122 detects the ink pressure in the ink channel 110 (for example, the ink pressure in the first storage tank 120 via the air in the first storage tank 120). The first pressure sensor 122 outputs a sensor signal indicating the magnitude of the detected pressure (hereinafter, referred to as pressure sensor value) [N/$m^2$].

The sensor signal of the first pressure sensor 122 is sent to the determiner 150. The first pressure sensor 122 is connected to, for example, the first storage tank 120.

The circulation pump 132 sends the ink inside the first storage tank 120 to the inkjet head 240 side, more specifically, to the second storage tank 140 via the ink channel 110, for example, the inter-tank channel 110*b*.

The circulation pump 132 sends out the ink in the ink channel 110 (e.g., the inter-tank channel 110*b*) to the second storage tank 140 via the filter 134, and further supplies the ink to the inkjet head 240 via the second storage tank 140.

The circulation pump 132 sends the ink in the circulation channel to the inkjet head 240 so as to circulate the ink. The circulation pump 132 brings the circulation channel into a communication state with the supply valve 116, the first valve 124, and the second valve 144 set to a closed state, and the first circulation valve 137 and the second circulation valve 138 set to an open state, and sends the ink to the downstream side. In this manner, circulating flow of the ink is generated by the circulation pump in the circulation channel.

The circulation pump 132 supplies the ink to the ink jet head 240, and returns the ink which is not ejected from the ink jet head 240 to the first storage tank 120 via the collection channel 110*d*. That is, by the driving of the circulation pump 132, a circulation flow of the ink returning to the first storage tank 120 from the first storage tank 120 through the second storage tank 140 and the ink jet head 240 is generated in the circulation path. The circulation pump 132 is controlled by a control signal from the controller 40 or the ink supplier 90.

The filter 134 removes a foreign substance such as dirt or dust mixed in ink flowing in the ink channel 110. The filter 134 is disposed between the first storage tank 120 and the second storage tank 140 in FIG. 4, that is, in the inter-ink channel 110*b*. The filter 134 includes, for example, a non-woven fabric having a porous structure.

In the second storage tank 140, an inlet (ink inflow port) communicates with the first storage tank 120 via the inter-tank channel 110*b*, and an outlet (ink outflow port) communicates with the ink inflow port of the corresponding inkjet head 240 via the second supply channel 110*c*. A plurality of the second storage tanks 140 are provided corresponding to the plurality of inkjet heads 240.

The second storage tank 140 temporarily stores the ink supplied from the first storage tank 120 at the time of image formation, and supplies the ink to the inkjet head 240 through the second supply channel 110*c*.

The second pressure sensor 142 detects the ink pressure in the ink channel 110 (for example, the ink pressure in the second storage tank 140 via the air in the second storage tank 140). The second pressure sensor 142 outputs a sensor signal indicating the magnitude of the detected pressure (hereinafter, referred to as pressure sensor value) [N/$m^2$].

The sensor signal of the second pressure sensor 142 is sent to the determiner 150 (which may be the controller 40). The second pressure sensor 142 is connected to, for example, the second storage tank 140.

The second valve 144 opens and closes the second storage tank 140 to seal or release the inside of the second storage tank 140. The second valve 144 is controlled by the controller 40 or the ink supplier 90 (determiner 150) and is normally in an open state.

Although only one ink jet head 240 is illustrated in FIG. 4 for the sake of simplicity, more ink jet heads 240 can be added in practice. In this case, the second storage tank 140, the inter-tank channel 110*b*, and the second supply channel 110*c* may be added by the number of added inkjet heads 240.

In the ink jet head 240, the inlet (ink inflow port) communicates with the second storage tank 140 via the second supply channel 110*c*, and the outlet (ink outflow port) communicates with the first storage tank 120 via the collection channel 110*d*.

In this example, the residual ink that is supplied to the ink jet head 240 through the second supply channel 110*c* and is not ejected by the ink jet head 240 is collected into the first storage tank 120 through the collection channel 110*d* by the operation of the circulation pump 132. The collected ink is reused by being supplied from the first storage tank 120 to the inkjet head 240 again through the pipe t4 or the like.

The first circulation valve 137 and the second circulation valve 138 open and close in order to collect, circulate, and reuse the ink that is not ejected by the ink jet head 240 among the ink supplied to the ink jet head 240.

The first circulation valve 137 and the second circulation valve 138 are controlled by the control unit 40 or the ink supplier 90 (determiner 150), and are normally in a closed state (NC).

The ink circulation system 100 includes a third pressure sensor 136 disposed directly on the ink channel 110. The third pressure sensor 136 is installed, for example, between the circulation pump 132 and the filter 134 on the inter-tank channel 110*b*. The third pressure sensor 136 detects the pressure in the ink in the inter-tank channel 110*b* and outputs a sensor signal indicating a magnitude of the detected pressure (hereinafter, referred to as pressure sensor value) [$N/m^2$].

The determiner 150 is connected to the controller 40, and includes a CPU, a RAM, a ROM, and a storage, similarly to the controller 40. The determiner 150 is mainly connected to the respective sections of the ink circulation system 100 (the respective valves 116, 124, 137, 138, and 142, and the first to third pressure sensors 122, 142, and 136), and also has a function of appropriately controlling these sections. Note that the determiner 150 may be included in the controller 40.

The determiner 150 mainly drives the liquid supply pump (specifically, the circulation pump 132) to feed the ink into the ink channel 110, and detects the pressure value of the ink by each of the first pressure sensor 122, the second pressure sensor 14, and the third pressure sensor 136.

The determiner 150 sends an ink to the ink channel 110, the first storage tank 120, and the second storage tank 140 at a flow rate different from a normal state, and compares the detected pressure value with a pressure value that is detected by sending the ink at the normal flow rate.

Through this comparison, the determiner 150 detects an abnormality, in particular, a serious abnormality (failure), before it occurs in the ink channel 110, the first storage tank 120, the second storage tank 140, or the like.

The determiner 150 executes or not executes the printing by controlling each unit constituting the ink circulation system 100 based on, for example, information regarding execution or non-execution of the printing. The determiner 150 sets a target value of the back pressure of the nozzles 243 of the inkjet head 240. The determiner 150 performs feedback control of the output of the supply pump 114 so that the ink pressure in the first storage tank 120 and the second storage tank 140 becomes a set target value (first and second target pressures).

Abnormality Detection Control of Ink Channel in Ink Circulation System 100

In the ink circulation system 100, the determiner 150 detects the liquid pressure of the ink in the ink channel 110 to which the ink has been fed at a flow rate different from that for the printing. The following describes a process in which, based on the detection result, the determiner 150 detects an abnormality of the ink channel 110, particularly an abnormality before becoming a serious abnormality (failure). In addition, since the abnormality detection control of the channel cannot be performed during printing, it is performed at a timing different from the print mode. In addition, as described above, since it is possible to perform control with higher sensitivity by accumulating the pressure (liquid pressure) value of the ink in the ink channel in the normal state as data, it is preferable to perform abnormality detection control of the channel when the power source of the inkjet recording apparatus 1 is turned on, for example. Thus, accumulating the detection data also makes it possible to predict abnormalities that occur after a given period due to abnormalities that occur over time.

First Pressure Sensor

Figure 5:
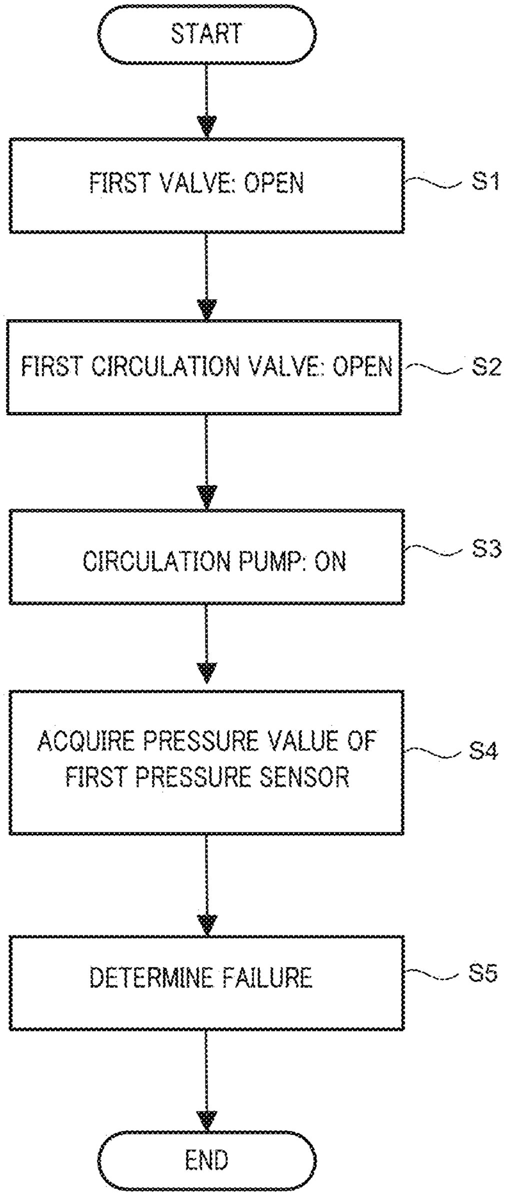
FIG. 5 is a flowchart illustrating an example of the in-channel abnormality detection process using the first pressure sensor.

With reference to FIGS. 5 and 6, an abnormality detection process in which the ink circulation system 100 (determiner 150) detects an abnormality in the channel using the first pressure sensor 122 is described below. The following describes an example in which the determiner 150 detects the liquid pressure of the ink fed at a flow rate lower than that in normal printing and compares the liquid pressure with a pressure value of a normal state to determine whether the ink channel 110 is abnormal.

FIG. 5 is a flowchart illustrating an example of an in-channel abnormality detection process using a first pressure sensor. As illustrated in FIG. 5, for example, the determiner 150 executes a channel failure detection process when a signal indicating the start of the process of detecting an abnormality in the ink channel is input from the control unit 40 to the ink supplier 90.

In step S1, the determiner 150 closes the first valves 124 in the ink circulation system 100 and proceeds to step S2, and in step S2, the determiner 150 opens the first circulation valve 137 and proceeds to step S3.

The determiner 150 drives ("ON") the circulation pump 132 to feed ink such that ink flows at a flow rate different from a normal flow rate, for example, at a flow rate lower than the normal flow rate in the ink channel in step S3.

The determiner 150 drives the circulation pump 132 such that the ink is supplied to the first storage tank 120 at a flow rate lower than the normal flow rate, for example, at a flow rate half the normal flow rate.

In step S4, the determiner 150 measures the pressure applied to the ink by the first pressure sensor 122, and proceeds to step S5. In step S5, the determiner 150 performs failure diagnosis on the basis of the measured pressures (e.g., the diagrams illustrated in FIG. 6A).

The failure diagnosis is performed by comparing the pressure value measured by the determiner 150 with a normal value of the liquid pressure of the ink when the liquid is fed at a flow rate different from a normal flow rate set in advance from a storage not illustrated in the drawing (which may be the storage 44). In step S5, the determiner 150 compares the actually measured value with a preset normal value, and determines that there is a leakage (failure) when the measured value is different from the normal value. In the determination in step S5, when the measured value is a normal value or a value regarded as normal, the determiner 150 determines that the ink channel is normal.

The normal value or the value regarded as the normal value is caused by a variation that occurs even when there is no abnormality in general pressure measurement, and the variation is, for example, a variation due to an individual difference of the pump (circulation pump) itself. Therefore, the circulation pump 132 is a pump whose performance is known in advance, and when a component such as a pump is replaced, data on each pressure transition is acquired and stored for each pump to be used. Through comparison with this value, the abnormality of the ink passage is detected. Specifically, a normal value for each pump that operates normally is set within a predetermined range. Through comparison of the value in this range with the actually measured value, the variation itself of the value of the abnormal state can be detected, and the variation of the individual difference of the pump is removed.

In this manner, the circulation pump 132 is rotated after the valve operation, and the pressure value in the ink channel is measured. For example, even if the normal flow rate is set to 3 to 6 cc/see, variations occur due to the individual difference of the pump and the use situation as described above. For example, in a case where there is an abnormality (leakage) in the channel around the first storage tank 120 at a flow rate of 5 cc/see at the time of normal measurement, the negative pressure value measured by the first pressure sensor 122 is small, and, in FIG. 6B, indicates a pressure reduction of approximately 6% measured at the normal flow rate.

In contrast, in a case where the pressures were measured with the flow rate of the circulation pump 132 set to half of the normal rate, for example, 1.5 to 3 cc/see (2.5 cc/see in the current measurement), the pressure reduction due to abnormality (leakage) was about 24%, which was greatly different from the normal rate.

As described above, regarding the variation in the normal pressure value, a certain variation occurs due to the variation in the amount of air in the first storage tank 120, the amount of air in the ink, the ink temperature, the power source situation, or the like in addition to the individual difference of the pump or the like, for example. Therefore, when the liquid pressures of the ink were measured while changing the above-described various variation factors, it was found that a variation of −4.2 to −4.8 kPa occurs at a normal flow rate. If there is a variation in the normal value in such a range, there is a case where the pressure at the time of abnormality (leakage) overlaps the pressure at the time of the normality, which makes failure determination difficult. However, when the liquid pressure was measured by feeding the ink into the ink channel 110 at a flow rate smaller than the normal flow rate, the variation of the ink in the normal state was −3.5 to −4.1 kPa particularly when the ink flow rate was half the normal ink flow rate. As a result, the pressure of the ink at the time of abnormality (leakage) does not overlap the pressure of the ink at the time of normality, which makes failure determination possible.

Figure 6A:
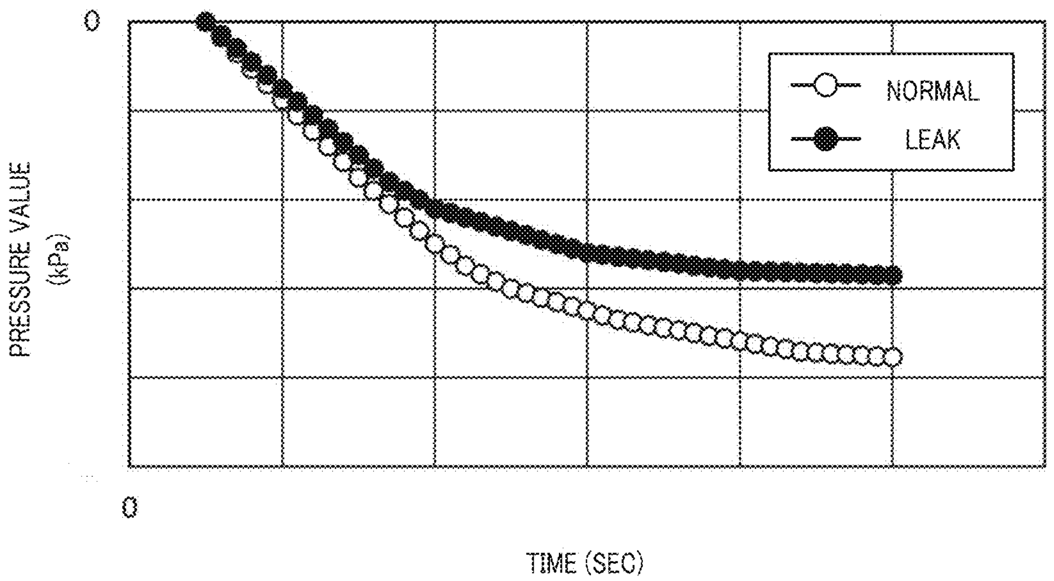
FIG. 6A is a diagram illustrating a relationship between a normal pressure value and an abnormal pressure value of a liquid pressure of ink supplied at a lower flow rate than normal in an ink channel.
Figure 6B:
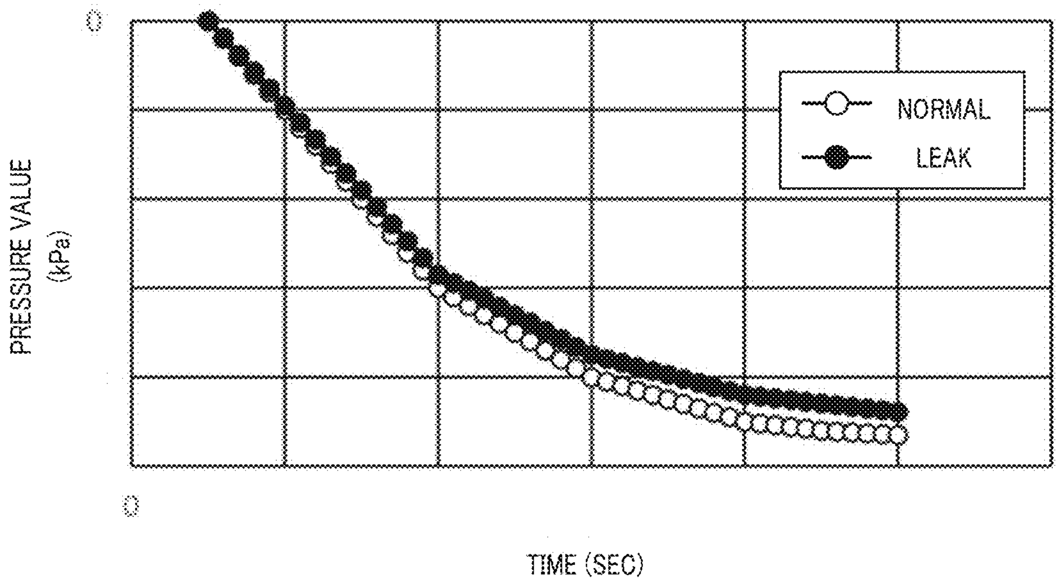
FIG. 6B is a diagram illustrating a relationship between a normal pressure value and an abnormal pressure value of a liquid pressure of ink supplied at a normal flow rate in an ink channel.

FIG. 6A is a diagram illustrating a relationship between a normal pressure value and an abnormal pressure value of a liquid pressure of ink supplied at a lower flow rate than normal in an ink channel. FIG. 6B is a diagram illustrating a relationship between a normal pressure value and an abnormal pressure value of a liquid pressure of ink supplied at a normal flow rate in an ink channel.

Specifically, as illustrated in FIG. 6A and FIG. 6B, the difference between the normal and abnormal values of the pressure value of ink is greater in the case of liquid fed at a flow rate that is half of the normal flow rate (a flow rate lower than the normal flow rate) than in the case of liquid fed at the normal ink flow rate.

In FIG. 6A, at an ink flow rate that is half of the normal flow rate, the difference between the normal pressure value and the pressure value indicating abnormality (leakage) is 24%, and in FIG. 6B, the difference between the two is 6%. The difference between pressure value of the normal state and the pressure value of the abnormal (leakage) state illustrated in FIG. 6A is larger than the difference between them in FIG. 6B.

That is, the determiner 150 can easily compare the pressure value of the liquid pressure of the ink in the first storage tank 120 (which may be the ink channel) with the normal value in the case where the ink flow rate in the ink channel is set to half of the normal flow rate, and can more clearly determine the abnormality.

Note that although the flow rate that is half of the normal flow rate is used as the flow rate that is lower than the flow rate in the normal printing, the present invention is not limited thereto, and the flow rate that is lower than the flow rate in the normal printing may be 0.1 to 0.7 times the flow rate of the normal printing. As described above, when the flow rate is within this range, even if there is a variation in the detected values, the pressure value of the normal state and the pressure value of the abnormal state do not overlap with each other, and both can be distinguished from each other.

As described above, when the liquid pressure of the ink detected is lower than the normal pressure value, it is determined that a failure has occurred due to leakage in the ink tank (the same applies to the ink channel), but it can be determined that a failure has occurred in the open/close valve disposed in the ink channel. Further, it may be determined that the circulation pump 132 is in failure.

In this case, similarly, the liquid pressure of the ink fed at a flow rate different from that in normal printing is detected using the third pressure sensor, and is compared with a normal pressure value. Thus, a slight abnormality before becoming a serious abnormality (failure) can be detected.

Second Pressure Sensor

Figure 7:
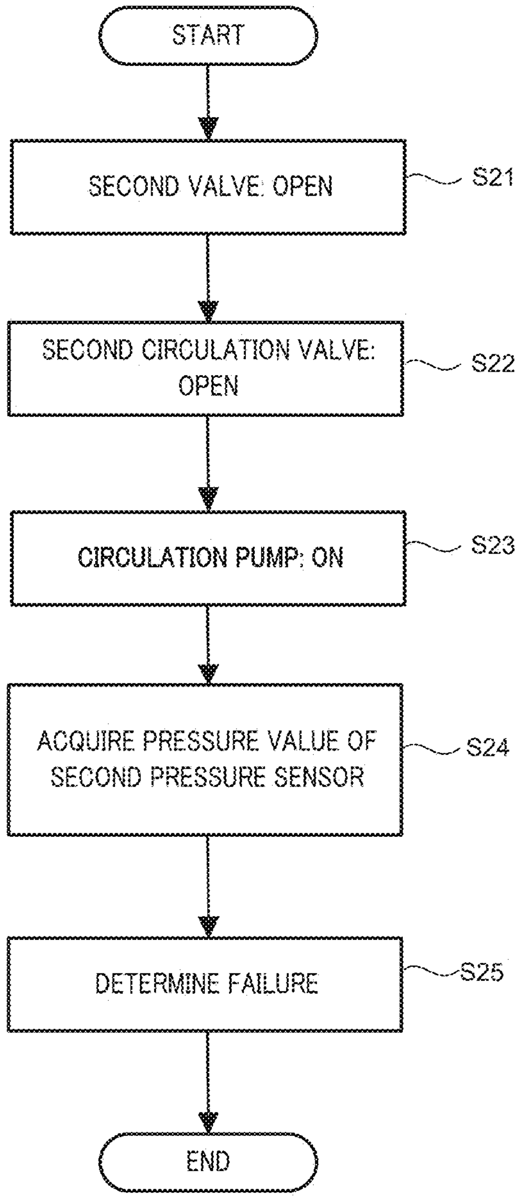
FIG. 7 is a flowchart illustrating an example of the in-channel abnormality detection process using the second pressure sensor.

Channel abnormality detection processing that the ink circulation system 100 (determiner 150) performs using the second pressure sensor 142 will be described with reference to FIG. 7 and FIG. 8. FIG. 7 is a flowchart illustrating an example of in-channel abnormality detection processing using a second pressure sensor.

As illustrated in FIG. 7, for example, the determiner 150 performs the channel failure detection process when a signal indicating the start of the process of detecting an abnormality in the ink channel is input from the control unit 40 to the ink supplier 90.

The determiner 150 closes the second valve 144 in step S21 in the ink circulation system 100, and proceeds to step S22. In step S22, the determiner 150 opens the second circulation valves 138 and proceeds to step S23.

In step S23, the determiner 150 drives ("ON") the circulation pump 132 to feed ink so that ink flows at a flow rate different from a normal flow rate, for example, a flow rate higher than a normal ink flow rate in the ink channel.

The determiner 150 drives the circulation pump 132 such that the ink is supplied to the second storage tank 140 at a flow rate larger than the normal flow rate, e.g., a flow rate that is twice the normal flow rate.

The determiner 150 measures, in step S24, the pressure applied to the ink by the second pressure sensor 142, and proceeds to step S25. In step S25, the determiner 150 performs failure diagnosis on the basis of the measured pressures (see normal values and abnormal values illustrated in FIG. 8).

The failure diagnosis is performed by comparing the pressure value measured by the determiner 150 with a normal value of the liquid pressure of the ink when the liquid is fed at a flow rate different from a normal flow rate preset from a storage (storage 44) (not illustrated).

In step S25, the determiner 150 compares the actually measured pressures with preset normal values, and determines that there is an abnormality (clogging or failure) when the measured values are different from the normal values. If it is determined in step S25 that the measured values are normal values or values regarded as normal values, the determiner 150 determines that the ink channel is normal.

In this manner, the pressure value is measured by rotating the circulation pump after the valve operation.

In a case where the filter 134 is clogged, the first circulation value 137 is broken, or the ink channel (second supply channel 110*c*) between the second storage tank 140 and the inkjet head 240 is clogged, the pressure value of the second pressure sensor 142 decreases. Therefore, similarly to the first pressure sensor 122, the flow rate of the circulation pump 132 is set and the pressure value is measured.

To detect abnormality (clogging) in the ink channel, the liquid was fed at a high flow rate, for example, at a flow rate twice as high as usual this time, and the pressure was measured. The pressure reduction rate at the time of occurrence of abnormality (clogging) with the normal flow rate was 11%, whereas it was 22% with the double flow rate, thus achieving a large difference.

Figure 8A:
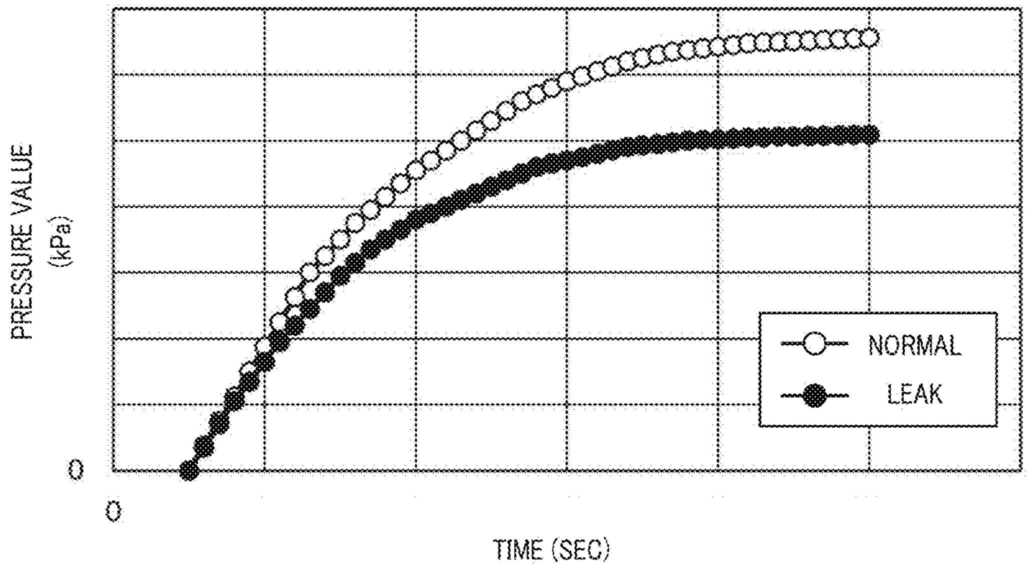
FIG. 8A is a diagram illustrating a relationship between a normal pressure value and an abnormal pressure value of a liquid pressure of ink supplied at a higher flow rate than usual in an ink channel.
Figure 8B:
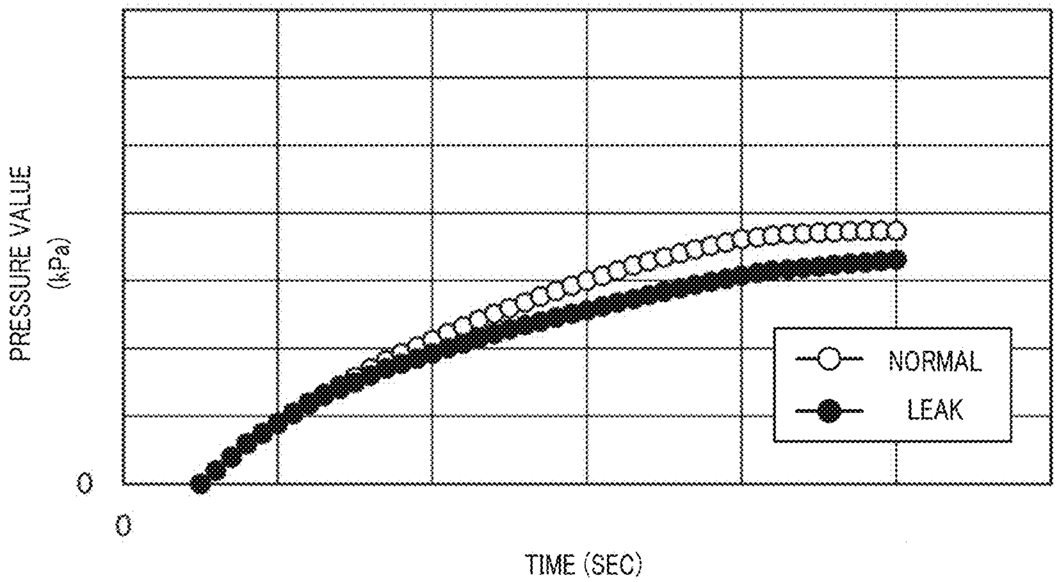
FIG. 8B is a diagram illustrating a relationship between a normal pressure value and an abnormal pressure value of a liquid pressure of ink supplied at a normal flow rate in an ink channel.

FIG. 8A is a diagram illustrating a relationship between a normal pressure value and an abnormal pressure value of a liquid pressure of ink that is supplied at a flow rate higher than usual in an ink channel. FIG. 8B is a diagram illustrating a relationship between a normal pressure value and an abnormal pressure value of a liquid pressure of ink supplied at a normal flow rate in an ink channel.

More specifically, as illustrated in FIGS. 8A and 8B, it has been found that the difference between the normal pressure value and the abnormal value of the ink is larger in the case where the ink is fed at a flow rate twice as high as the normal flow rate (a flow rate higher than the normal flow rate) than in the case where the ink is fed at the normal flow rate.

In FIG. 8A, the difference between the normal pressure value and the abnormal pressure value (clogging) is 22%, whereas in FIG. 8B, the difference between them is 11%. The difference between the pressure value of the normal state and the pressure value of the abnormal (clogged) state illustrated in FIG. 8A is larger than the difference between both in FIG. 8B. The determiner 150 can easily compare the pressure value of the liquid pressure of the ink in the second storage tank 140 (which may be the ink channel) with the normal value in a case where the ink flow rate in the ink channel is set to half of the normal flow rate, and can more clearly determine the abnormality.

Therefore, the determiner 150 can clearly determine the normal state and the failure (abnormality, clogging) state which cannot be distinguished by the normal ink flow rate, and can prevent the serious failure by coping with the failure which becomes the serious failure later as a minor failure.

Note that although the flow rate that is higher than during normal printing has been described as twice the normal flow rate, there is no limitation thereto, and the flow rate that is higher than during normal printing need only be 1.5 to 3 times the flow rate during normal printing. When the flow rate is within this range, as described above, even if there is a variation in the detected values, the pressure value of the normal state and the pressure value of the abnormal state do not overlap with each other, and both can be distinguished from each other.

As described above, when the liquid pressure of the ink detected is higher than the normal pressure value, it is determined that the failure is due to the leakage in the ink tank (the same applies to the ink channel), but it can be determined that the failure is in the open/close valve disposed in the ink channel. Further, it may be determined that the circulation pump 132 is in failure.

In this case, similarly, the liquid pressure of the ink fed at a flow rate different from that in normal printing is detected using the third pressure sensor, and is compared with a normal pressure value. Thus, a slight abnormality before becoming a serious abnormality (failure) can be detected.

Third Pressure Sensor

The determiner 150 sends the ink at a flow rate different from that at the time of printing and measures the liquid pressure of the ink in the ink channel (inter-tank channel 110*b*) using the third sensor 136.

For example, as in the case of using the first pressure sensor 122, an ink is fed at a flow rate lower than a normal flow rate. In addition, for example, as in the case where the second pressure sensor 142 is used, the ink is fed at a flow rate higher than the normal flow rate. Next, the determiner 150 detects the liquid pressure of the fed ink and compares the liquid pressure with a normal liquid pressure to determine whether or not there is an abnormality in each of the ink channels. In this manner, even when the third pressure sensor 136 is used, it is possible to determine a failure (abnormality before becoming a serious abnormality) of the inter-tank channel 110*b* in the same manner as the case where the first pressure sensor 122 and the second pressure sensor 142 are used The first pressure sensor 122 and the second pressure sensor 142 measure the air pressure in the first storage tank 120 and the second storage tank 140, and measure the liquid pressure of the ink inside each tank using the air pressure as a medium. Since air has a function of absorbing pressure, the sensitivity of the sensor slightly decreases when air is used as a medium. In contrast, since the third pressure sensor 136 is disposed directly in the ink channel 110, the sensitivities of the first pressure sensor and the second pressure sensor do not decrease.

Effects

When an abnormality (failure) in the ink channel is detected, since a conventional device is configured to detect an error in a normal use state at a normal flow rate using a pressure sensor, it is not possible to perform detection until a serious failure (abnormality) actually occurs in the ink channel, and it is not possible to provide a notification to that effect. Further, since it is not possible to determine whether the failure is a clogging-related failure or a leakage-related failure, even in a case where a serious failure that has occurred is detected and repaired, the location of the failure is not known, and it takes time to repair the failure.

On the other hand, according to the inkjet recording apparatus of the present embodiment, the ink is fed at a flow rate different from the normal flow rate, and the pressure (corresponding to the liquid pressure) in the ink channel (the ink channel 110 itself, the first storage tank 120, and the second storage tank 140) at that time is detected.

It has been found that there are two cases in the detection of the abnormality of the ink channel as described below. One of the cases is a case where the pressure variation of the fed ink becomes large and the detection accuracy increases when the ink feeding amount is larger than the normal total liquid amount. For example, abnormalities for which a large liquid feed amount is advantageous include clogging of the ink channel or clogging of the filter 134. In the case of clogging-related abnormalities (failures), the ink concentrates at a clogging portion in the ink channel as the ink flow rate is higher, and therefore, the pressure becomes more remarkably high.

The other is a case where the pressure variation of the ink becomes large and the detection accuracy increases in a case where the liquid feed amount of the ink is smaller than the normal liquid feed amount. For example, abnormalities for which a small liquid feed amount is advantageous is assumed to be leakage of the ink channel, a reduction in the performance of the circulation pump (pump) 132, or the like. In the case of the leakage-related abnormalities (failures) and the abnormalities (failures) related to the reduction in pump performance, the flow rate of the ink becomes lower than that of a normal state. In a case where the original ink flow rate is sufficiently high, even if the ink flow rate decreases, the amount of decrease is likely to be buried in an error that is a normal variation range, and the detection sensitivity becomes worse. Conversely, when the ink flow rate is reduced, the sensitivity increases.

The inkjet recording apparatus 1 controls the abnormality detection in the ink channel by using the determiner 150, changes the ink feeding amount, and detects the pressure (liquid pressure) of the ink.

That is, an abnormality in an ink channel for supplying ink from the ink tank 112 to the inkjet head (recording head) 240 is detected. The ink in the ink channel 110 is fed at a flow rate different from that for the printing, and then the liquid pressure of the ink fed to the ink channel 110 at the different flow rate different from the flow rate for printing is detected. Next, the liquid pressure of the ink detected is compared with the liquid pressure of the ink normally sent at a flow rate different from that of printing, and it is determined whether or not there is an abnormality in the ink channel 110.

Thus, the inkjet recording apparatus 1 detects the variation itself in the value of the abnormal state using the determiner 150, and can detect the abnormality in the ink channel, in particular, the failure that becomes the serious failure with high detection accuracy for each abnormality. Specifically, since even a slight abnormality can be detected, repair can be easily performed. Further, as for the filter 134 or the like that is deteriorated (clogged) in with use time, it can be used for predictive detection of durability. According to the inkjet recording apparatus of the present invention, it is possible to increase the accuracy of detection of an abnormality in the ink channel, detect the abnormality before the abnormality becomes serious, and easily repair the apparatus.

Hereinabove, the embodiment of the present invention has been described. Note that the above description is an exemplification of a preferred embodiment of the present invention, and the scope of the present invention is not limited to this. That is, the description on the configuration of the apparatus and the shape of each part described above is an example, and it is obvious that various modifications and additions can be made to these examples within the scope of the present invention.

Although embodiments of the present invention have been described and illustrated in detail, the disclosed embodiments are made for purpose of illustration and example only and not limitation. The scope of the present invention should be interpreted by terms of the appended claims.

What is claimed is:

1. An inkjet recording apparatus, comprising:

an ink channel that connects a recording head and an ink tank containing ink to be supplied to the recording head;

a pressure sensor that detects a liquid pressure in the ink channel or the ink tank;

a liquid feeder that applies pressure to the ink in the ink channel or the ink tank to feed the ink at a different flow rate different from a flow rate for printing; and one or more hardware processors, wherein the one or more hardware processors determine whether or not there is an abnormality in the ink channel based on a liquid pressure of the ink fed at the different flow rate.

2. The inkjet recording apparatus according to claim 1, wherein the different flow rate different from the flow rate for printing is a high flow rate higher than a flow rate of normal printing, and wherein the one or more hardware processors detect the liquid pressure of the ink fed at the high flow rate, and compare the liquid pressure with a pressure value of a normal state to determine the abnormality.

3. The inkjet recording apparatus according to claim 2, wherein the one or more hardware processors determine the abnormality to be clogging in the ink channel or the ink tank when the liquid pressure of the ink detected is higher than the pressure value of the normal state.

4. The inkjet recording apparatus according to claim 1, wherein the different flow rate different from the flow rate for printing is a low flow rate lower than a flow rate of normal printing, and wherein the one or more hardware processors detect the liquid pressure of the ink fed at the low flow rate, and compare the liquid pressure with a pressure value of a normal state to determine the abnormality.

5. The inkjet recording apparatus according to claim 4, wherein the one or more hardware processors determine the abnormality to be a leakage in the ink channel or the ink tank when the liquid pressure of the ink detected is lower than the pressure value of the normal state.

6. The inkjet recording apparatus according to claim 4, wherein the one or more hardware processors determine the abnormality to be a failure of a pump as the liquid feeder when the liquid pressure of the ink detected is lower than the pressure value of the normal state.

7. The inkjet recording apparatus according to claim 4, wherein the one or more hardware processors determine the abnormality to be a failure of an open/close valve disposed in the ink channel when the liquid pressure of the ink detected is lower than the pressure value of the normal state.

8. The inkjet recording apparatus according to claim 2, wherein the high flow rate is 1.5 to 3 times the flow rate of normal printing.

9. The inkjet recording apparatus according to claim 4, wherein the low flow rate is 0.1 to 0.7 times the flow rate of normal printing.

10. An abnormality detection method for an ink channel that supplies ink from an ink tank to a recording head, the method comprising:

feeding the ink in the ink channel at a different flow rate different from a flow rate for printing;

detecting a liquid pressure of the ink fed to the ink channel at the different flow rate different from the flow rate for printing; and determining whether the ink channel is abnormal by comparing the liquid pressure detected with a liquid pressure of the ink normally fed at the different flow rate different from the flow rate for printing.

* * * * *